United States Patent

Samdanis et al.

(10) Patent No.: US 9,485,779 B2
(45) Date of Patent: Nov. 1, 2016

(54) METHOD FOR RESOURCE MANAGEMENT IN A TDD CELLULAR COMMUNICATION NETWORK AND RESOURCE MANAGEMENT SYSTEM

(75) Inventors: Konstantinos Samdanis, Dossenheim (DE); Peter Rost, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 4 days.

(21) Appl. No.: 14/375,493

(22) PCT Filed: Feb. 15, 2012

(86) PCT No.: PCT/EP2012/052574
§ 371 (c)(1),
(2), (4) Date: Jul. 30, 2014

(87) PCT Pub. No.: WO2013/120517
PCT Pub. Date: Aug. 22, 2013

(65) Prior Publication Data
US 2015/0055517 A1 Feb. 26, 2015

(51) Int. Cl.
*H04J 3/00* (2006.01)
*H04B 7/005* (2006.01)
*H04W 72/12* (2009.01)
*H04W 36/00* (2009.01)
*H04L 5/14* (2006.01)
(Continued)

(52) U.S. Cl.
CPC ............ *H04W 72/1252* (2013.01); *H04L 5/14* (2013.01); *H04W 36/0055* (2013.01); *H04W 36/22* (2013.01); *H04W 92/20* (2013.01)

(58) Field of Classification Search
CPC ......... H04W 72/1252; H04W 72/042; H04W 72/0413; H04W 92/20; H04W 36/22; H04W 72/005; H04L 5/14

USPC .......................................................... 370/280
See application file for complete search history.

(56) References Cited

U.S. PATENT DOCUMENTS 6,839,333 B1* 1/2005 Åkerberg ............ H04W 56/003
370/322
8,750,887 B2* 6/2014 Chandrasekhar ..... H04L 5/0096
370/252
(Continued)

OTHER PUBLICATIONS

3GPP TS 36.000, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Apr. 2011.
(Continued)

*Primary Examiner* — Gerald Smarth
(74) *Attorney, Agent, or Firm* — Leydig, Voit & Mayer, Ltd.

(57) ABSTRACT

A method for resource management in a cellular communication network, wherein said network includes at least one base station per cell for a plurality of cells that operates in TDD (Time Division Duplex) transmission mode, each base station having a respective coverage area is characterized in that said base stations are operated such that spatial zones exist—overlap areas—in which the coverage areas of at least two of said base stations overlap, wherein UEs within an overlap area utilize UL and/or DL resources from those of the respective base stations that best match their particular traffic demands in the UL and/or in the DL. Furthermore, a corresponding resource management system for use in a cellular communication network is disclosed.

15 Claims, 5 Drawing Sheets

(51) Int. Cl.
 *H04W 36/22* (2009.01)
 *H04W 92/20* (2009.01)

(56) References Cited

U.S. PATENT DOCUMENTS

| | | | |
|---|---|---|---|
| 2003/0202541 A1* | 10/2003 | Lim | H04B 1/7083 370/503 |
| 2007/0161389 A1* | 7/2007 | Khandekar | H04W 72/042 455/517 |
| 2008/0039129 A1* | 2/2008 | Li | H04L 1/0003 455/522 |
| 2009/0323530 A1 | 12/2009 | Trigui et al. | |
| 2012/0076024 A1* | 3/2012 | Ko | H04L 1/0026 370/252 |

OTHER PUBLICATIONS

3GPP TR 36.902, $3^{rd}$ Generation Partnership Project; Technical Specification Group Radio Access Network; Evolved Universal Terrestrial Radio Access Network (E-UTRAN); Self-configuring and self-optimizing network (SON) use cases and solutions (Release 9), Apr. 2011.

3GPP TS 25.111, $3^{rd}$ Generation Partnership Project; Technical Specification Group Radio Access Network; Location Measurement Unit (LMU) performance specification; User Equipment (UE) positioning in UTRAN (Release 9), Dec. 2009.

Wang Weidong, et al., "A call admission control algorithm based on inter-link load balance in heterogeneous networks", Broadband Network & Multimedia Technology, $2^{nd}$ IEEE International Conference, Oct. 18, 2009, pp. 356-360.

$3^{rd}$ Generation Partnership Project; Technical Specification Group Radio Access Network; Evolved Universal Terrestrial Radio Access Network (E-UTRAN); Self-configuring and self-optimizing network (SON) use cases and solutions (Release 9), V9.3.1, Apr. 1, 2011, pp. 13-14.

Nokia Corporation, et al., "SON WI Status Overview", 3GPP Draft; R2-093231, $3^{rd}$ Generation Partnership Project (3GPP), Apr. 28, 2009, pp. 1-2.

Fujitsu, "Discussion on DL coordinated multipoint transmission", 3GPP Draft; R1-083115, $3^{rd}$ Generation Partnership Project (3GPP), Aug. 13, 2008, pp. 1-3 and pp. 4-6.

ETRI, "Coordinated multi-cell transmission for LTE-Advanced downlink", 3GPP Draft; R1-082896 Multi-Cell MIMO, $3^{rd}$ Generation Partnership Project (3GPP), Aug. 12, 2008, pp. 1-4.

\* cited by examiner

METHOD FOR RESOURCE MANAGEMENT IN A TDD CELLULAR COMMUNICATION NETWORK AND RESOURCE MANAGEMENT SYSTEM

CROSS-REFERENCE TO RELATED APPLICATIONS

This application is a U.S. National Phase application under 35 U.S.C. §371 of International Application No. PCT/EP2012/052574, filed on Feb. 15, 2012. The International Application was published in English on Aug. 22, 2013 as WO 2013/120517 A1 under PCT Article 21(2).

FIELD

The present invention relates to a method for resource management in a cellular communication network, wherein said network includes at least one base station per cell for a plurality of cells that operates in TDD (Time Division Duplex) transmission mode, each base station having a respective coverage area.

Furthermore, the present invention relates to a resource management system for use in a cellular communication network, wherein said network includes at least one base station per cell for a plurality of cells that operates in TDD (Time Division Duplex) transmission mode, each base station having a respective coverage area.

BACKGROUND

Time Division Duplex (TDD) is a transmission mode supported both in 3GPP UMTS, LTE (Long Term Evolution) and IEEE 802.16 that utilizes the same radio access scheme as the Frequency Division Duplex (FDD), i.e. in case of LTE OFDMA (Orthogonal Frequency-Division Multiple Access) in the downlink and the SC-FDMA (Single Carrier Frequency-Division Multiple Access) in the uplink, CDMA in case of UMTS and OFDMA in case of IEEE 802.16 in both uplink and downlink. Furthermore, TDD uses the same subframe format as well as the same configuration protocols as FDD. The main difference compared with FDD is that TDD macro cellular base stations, or evolved Node B (eNBs) in 3GPP terminology, support an unpaired frequency band, where downlink and uplink are separated in time domain, with each frame being composed by downlink (DL), uplink (UL) and special (S) sub-frames.

Special sub-frames are used to switch from downlink to uplink and they are included at least once within each frame. In particular, the special sub-frame consists of the following three special fields, a downlink part (DwPTS), a guard period (GP), and an uplink part (UpPTS). In 3GPP LTE, the UL/DL portion of each frame may be configured according to the specification provided in document 3GPP TS 36.300, Technical Specification Group Radio Access Network; Evolved Universal Terrestrial Radio Access (E-UTRA) and Evolved Universal Terrestrial Radio Access Network (E-UTRAN); Overall description; Stage 2 (Rel 10), April 2011, which defines 7 different UL/DL configuration modes as shown in the following table:

| Uplink-downlink allocations | | | | | | | | | | |
|---|---|---|---|---|---|---|---|---|---|---|
| Config- | Switch-point | Subframe number | | | | | | | | |
| uration | periodicity | 0 | 1 | 2 | 3 | 4 | 5 | 6 | 7 | 8 | 9 |
| 0 | 5 ms | DL | S | UL | UL | UL | DL | S | UL | UL | UL |
| 1 | 5 ms | DL | S | UL | UL | DL | DL | S | UL | UL | DL |
| 2 | 5 ms | DL | S | UL | DL | DL | DL | S | UL | DL | DL |
| 3 | 10 ms | DL | S | UL | UL | UL | DL | DL | DL | DL | DL |
| 4 | 10 ms | DL | S | UL | UL | DL | DL | DL | DL | DL | DL |
| 5 | 10 ms | DL | S | UL | DL | DL | DL | DL | DL | DL | DL |
| 6 | 5 ms | DL | S | UL | UL | UL | DL | S | UL | UL | DL |

Despite the provision of flexibility in resource allocation, such asymmetric UL/DL brings new challenges in admission control and load balancing. The main difference from the conventional FDD resource allocation is the fact that in TDD it is a slot specific process, with each slot being considered individually. Certain overloaded slots may introduce congestion for particular applications with specific UL/DL-requirements regardless of resource availability on different slots. Such phenomenon is referred in literature as "pseudo congestion," because an eNB or cell seems congested without its resources being fully utilized.

Figure 1:
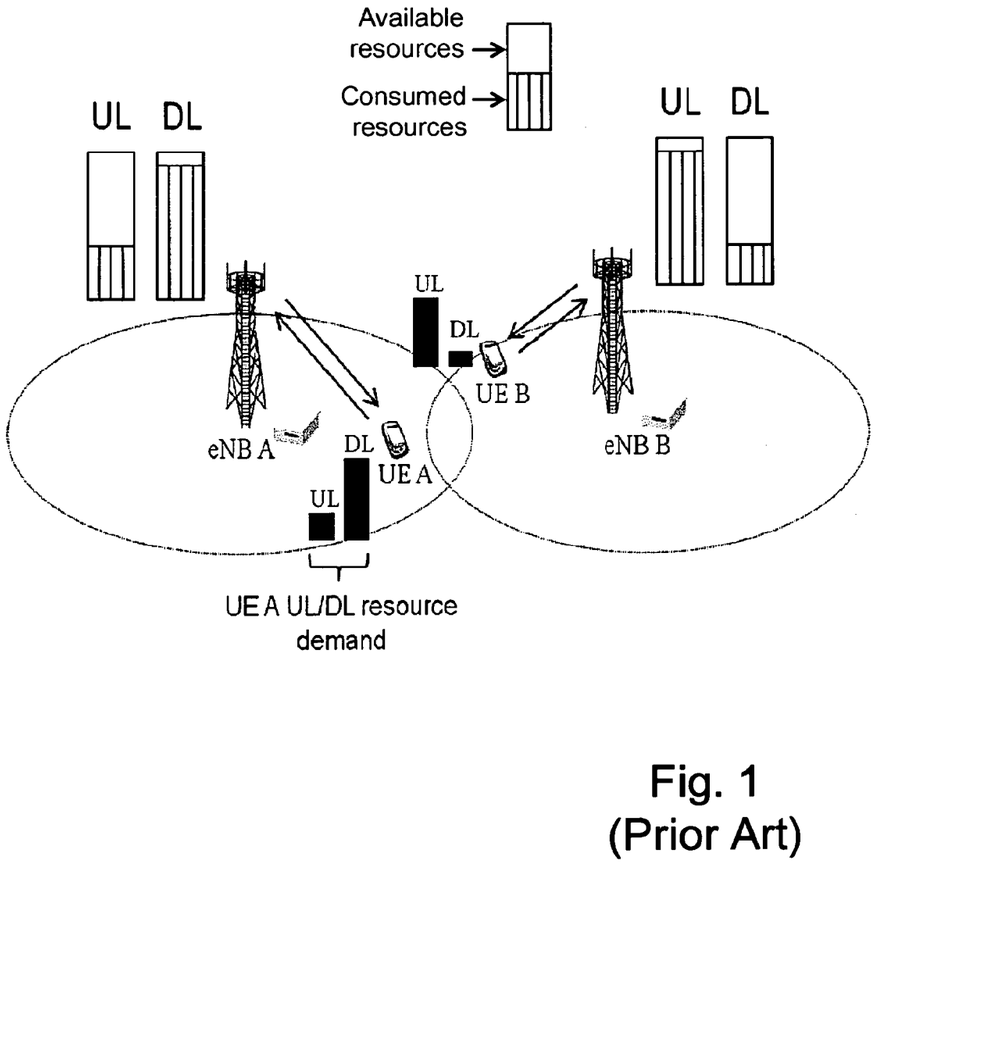
FIG. 1 is a schematic view of a cellular communication network that illustrates the problem of "pseudo congestion" in TDD systems.

A simple example to demonstrate "pseudo congestion" is illustrated in FIG. 1, where User Equipment UE A, served by eNB A, with high DL demand creates and experiences congestion due to the restricted availability of DL resources of eNB A, while the same situation accounts for UE B, served by eNB B, with high UL demands due to low UL resource availability of eNB B. It should be noted that in both cases the associated eNBs are not fully overloaded since they have available resources, eNB A in the uplink and eNB B in the downlink.

Initial efforts towards Call Admission Control (CAC) solutions for TDD systems that consider such mismatch of UL/DL resource allocation concentrate on decoupling the problem into two independent ones that focus on the UL and DL, with each CAC module employing a particular policy separately. Such approach is described, for instance, in B. Rong, et. al, "Call Admission Control Optimization in WiMAX Networks", IEEE Transactions on Vehicular Technology, Vol. 57, No. 4, July 2008. Connection requests with a traffic demand that fulfills both UL and DL CAC are permitted to be established. Such a policy realizes the significance of asymmetric UL and DL treatment within CAC, which is also important for the process of load balancing in TDD and "pseudo congestion."

TDD specific load balancing shares similarities with conventional cell breathing, as described, e.g., in US 2009/0323530 A1. Cell breathing refers to the process which regulates the number of serving users per cell by increasing or decreasing cell size or coverage area. TDD load balancing also adopts cell size and traffic concentration regulation concepts but is based on UL and DL separately compared to conventional cell-breathing. The non-separated treatment of UL and DL is the main cause of the "pseudo congestion" problem. Therefore, the load balancing problem in TDD has two dimensions, named the load variation among neighboring cells and the variation among UL and DL or other levels of asymmetry, as described in M. Peng, W. Wang, "A Framework for Investigating Radio Resource Management Algorithms in TD-SCDMA Systems", IEEE Communication Magazine, Vol. 43, No. 6, June 2005.

Previous efforts to resolve the "pseudo congestion" problem concentrate on heterogeneous environments where base stations and Wi-Fi access points operate in TDD, as described in W. Weidong, et. al., "A Call Admission Control Algorithm based on Inter-Link Load Balance in Heterogeneous Networks", IEEE IC-BNMT Beijing, October 2009. The focus is on CAC and on specific algorithms based on the notion of inter-link load imbalance, which refers to the difference in resource utilization among UL and DL of a single base station or access node. The aim is to keep such inter-link load imbalance as low as possible by the means of matching the user demands with the system resource availability. In particular, a user assigning algorithm identifies the appropriate base station or access point with the resource availability closer to the particular application characteristics in terms of UL/DL demand. In other words, the CAC algorithm chooses the attachment point or network that produces the smallest imbalance distance between its UL and DL resource availability.

Figure 2:
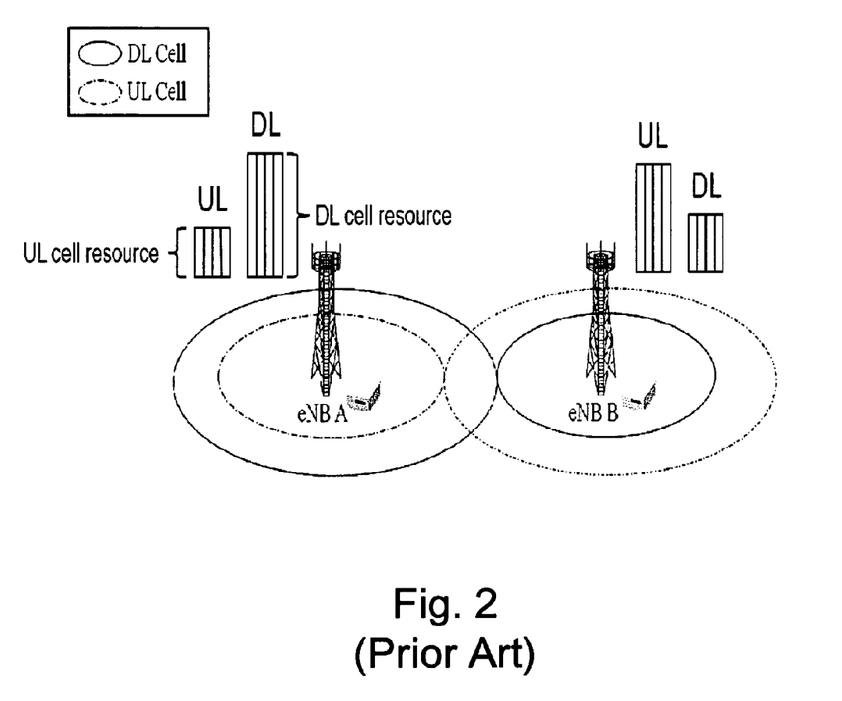
FIG. 2 is a schematic view of a cellular communication network that illustrates adaptive cell coverage for UL and DL channels according to prior art.

An alternative approach that treats the UL and DL channels independently with respect to the cell coverage and the corresponding geographical area has been described in K. Mori, et. al, "Asymmetric Traffic Accommodation using Adaptive Cell Sizing Technique for CDMA/FDD Cellular Packet Communications", IEICE Trans. Fundamentals Vol. E90-A, No. 7, July 2007. The aim is the provision of asymmetric UL/DL resource allocation with the objective to match the capacity offered by operators to the traffic demand for every cell within the Radio Access Network (RAN). The means of such asymmetric UL/DL resource allocation is to configure independently for UL and DL channels its coverage size jointly with neighboring cells. Thus, the UL and DL cell coverage may be different which provides a higher degree of resource flexibility. This allows load balancing not only on conventional cell breathing basis but additionally based on each particular channel load in relation with the user's geographical position and cell load conditions. A simple example that demonstrates the main concept is illustrated in FIG. 2, where eNB A accommodates, compared to eNB B, a higher density of DL users than UL users.

Although the prior art solutions described above manage to solve the "pseudo congestion" problem, they are disadvantageous in that they prove to be rather inflexible with respect to an adaptation to individual UE UL/DL demands.

SUMMARY

It is therefore an object of the present invention to improve and further develop a method and a system of the initially described type for resource management in a cellular communication network in such a way that a high degree of flexibility for UEs to utilize UL/DL resources that match their specific needs is achieved.

In an embodiment, a method is characterized in that said base stations are operated such that spatial zones exist—overlap areas—in which the coverage areas of at least two of said base stations overlap, wherein UEs within an overlap area utilize UL and/or DL resources from those of the respective base stations that best match their particular traffic demands in the UL and/or in the DL.

In an embodiment, a a system is characterized in that it comprises a management mechanism that effects operation of base stations in such a way that spatial zones exist—overlap areas—in which the coverage areas of at least two of said base stations overlap, and that assists UEs within an overlap area to utilize UL and/or DL resources from those of the respective base stations that best match their particular traffic demands in the UL and/or in the DL.

According to the invention it has first been recognized that a significant gain in flexibility for mobile users can be achieved by introducing overlapping areas in which mobile users may be able to connect to more than one single base station, thereby giving them the opportunity to utilize resources from more than a single cell at the same time. Such a scheme brings a high degree of flexibility since it allows users to connect to base stations in such a way that the UL/DL load ratio matches their specific traffic demands separately in the UL and in the DL. Hence, base stations as well as UEs not only exploit the spatial domain for "cell breathing" but additionally use the time-domain to change the cell-setup. Such an approach may resolve the problem of "pseudo congestion" among neighboring cells and, consequently, it provides load balancing and efficient resource utilization in TDD systems, in particular in asymmetric UL/DL TD-LTE macro cellular networks.

According to a preferred embodiment mobile users within an overlap area may utilize UL and DL resources from different base stations. For instance, a UE may utilize the DL resources of one base station and the UL resource of another base station to match better its traffic demand and the network resource availability. This may be particularly useful in cases in which individual base stations are not capable of satisfying both UL and DL user requirements at the same time.

With respect to a full exploitation of the benefits resulting from the fact that UEs utilize UL and DL resources from different base stations, it may be provided that base stations with overlapping coverage areas employ different UL/DL-patterns. Mobile users can then benefit from these different UL/DL-patterns by generating an individualized UL/DL utilization pattern in which they utilize single slots from different base stations. In other words, an individual TDD frame may be customized for a UE by utilizing single slots of a TDD base station frame from different base stations. In order to assist the UE in this process, it may be provided that the base stations inform the UEs about their UL/DL configuration, for instance by broadcasting appropriate signaling messages on a regular basis. Mobile users can use this information to synchronize their transmit/receive modes accordingly. Thus, the proposed method requires additional signaling and controlling overhead as UEs may be assigned to multiple base stations.

With respect to an efficient management of this signaling and controlling overhead, "super-cells" may be implemented where adjacent cooperating base stations appear as one base station (a "super-cell") but still provide different physical configurations. Within a super-cell a UE may utilize UL and/or DL frame slots from different base stations of the super-cell within a frame. More specifically, UEs may use UL or DL resource units from more than one base station within one UL-DL-periodicity-frame. In this way the use of network resources may be even more flexible and efficient, providing the opportunity to support more diverse applications.

With respect to achieving still further resource flexibility, in some scenarios it may be provided that two or more regions are created within an overlapping area, wherein theses regions support different traffic demands offering a different set of UL/DL slots to residing UEs. In particular, such deployment is expected to become more diverse as the cell sizes become smaller and the number of neighboring cells increases.

The creation of a super-cell among neighboring eNBs may be implemented as a process that is carried out on demand based on network resource availability and/or on UE resource requirements within different geographical areas.

Consequently, this process exhibits a dynamic behavior that suits best the paradigm of Self-Organized Networks (SON), as described in document 3GPP TR 36.902, Evolved Universal Terrestrial Radio Access Network (E-UTRAN); Self-configuring and self-optimizing network (SON) use cases and solutions, April 2011. The aim of such a SON function is to monitor the resource utilization in order to change the coverage parameters of certain cells or eNBs accordingly. This can be achieved by reconfiguring the transmission power and the antenna tilt/pilot pattern. In this way, it creates different types of overlapping area in terms of size and location.

According to a preferred embodiment a monitoring mechanism is provided in which the base stations monitor traffic load in the UL and/or in the DL for locations within their respective coverage areas. This monitoring mechanism may be carried out using UE positioning techniques, e.g., the ones described in document 3GPP TS. 25.111, Technical Specification Group RAN; LMU performance specification; UE positioning in UTRAN, (Rel 9), December 2009. In addition, in connection with such SON functionality base stations may be configured to regularly exchange load information related to the UL and DL resources. In 3GPP cases such an exchange of load information could be carried out using the X2 interface, for which certain extensions are needed. In order to achieve various overlapping scenarios among neighboring cells, coverage alternations, i.e. coverage extension or shrinking, may be performed based on pre-determined steps that determine the antenna tilt, transmission power, etc. However, more flexible coverage adjustments are possible as documented for instance in M. Amirijoo, L. Jorgušeski, R. Litjens, R. Nascimento, "Effectiveness of cell outage compensation in LTE networks", CCNC 2011, Las Vegas, January 2011.

In essence, this SON function has similarities with the equivalent load balancing SON one for FDD but the main differences rely on the fact that the present approach considers cooperation among neighboring base stations creating in this way the notion of a super-cell that treats UL and DL separately on a slot basis. The creation of super-cells and multiple regions with different UL/DL characteristics may be accomplished using different power levels within each slot of each particular eNB, e.g. as specified in EP 11 006 118 (not yet published). The combination of such multiple power levels may also create specific regions with different UL/DL utilization.

Algorithms to implement the power control may include:
Fixed maximum power in "silent" sub-frames based on a previously performed training phase
Time-zones with different maximum power based on previous training phases; UEs are scheduled to these time-zones depending on their long-term SNR (Signal-to-Noise Ratio)
Per-frame signaling between base stations and adjustment of interference power to allow for sequential interference cancellation
The previous one plus the option to control the maximum interference power depending on the backhaul capacity and the maximum number of users for which such an algorithm can be applied
Sparing out parts of the spectrum in the DL reduces also the emitted power in time-domain and avoids the problem that the useful signal is either "drowned" in noise or the automatic gain-control reaches the saturation region, i.e. FR>1 at one base station to avoid drowning a UE at the other base station in the UL.

In this regard it should be noted that the UL-DL ratio not only depends on the data demand but also channel condition and therefore the UL-DL ratio may vary depending on location and geographical characteristics.

According to a preferred embodiment the process of transmission and reception via multiple base stations may be coordinated conforming certain synchronization targets with the objective that the data towards and from a mobile terminal appears as a single stream. In a specific embodiment this may be achieved by transmitting duplicated data to all participating base station, or by transferring data towards the transmitting base stations using the X2 interface. Alternatively, in a 3GPP LTE scenario, data sessions may be split in the PDN-Gateway (P-GW) or in the Serving-Gateway (S-GW) before reaching the appropriate base stations. Prior CoMP (Coordinated Multi-Point according to 3GPP TR 36.819) methods including the joint transmission and the coordinated scheduling may also be employed to successfully satisfy such requirements.

Once super-cells are created, mechanisms to perform maintenance and management are necessary. Such mechanisms may also be SON based and they may be responsible for two processes. One involves continuous monitoring and performing coverage adjustments, while the other one is related to the management of the current formation. The maintenance process is analogous to the super-cell creation, while the management mostly embraces mechanisms that aim to maintain the current super-cell formation as long as possible in order to control the transition overhead.

In a specific embodiment the management mechanism mainly involves handover decision processes that aim to assign UEs, residing at the edge among different UL/DL regions, to the appropriate region or cell. It takes into account the user UL/DL demand as well as the region resources and its UL/DL frame structure. Beside the target cell or region selection the handover decisions should avoid ping-pong effects and for this reason hysteresis mechanisms are also essential.

An embodiment of the super-cell concept may focus on overlaid cells that provide capacity increase at specific hot-spots to enhance and customize the resource usage for residing users. Another embodiment includes scenarios of small cell deployments with diverse traffic demands.

BRIEF DESCRIPTION OF THE DRAWINGS

There are several ways how to design and further develop the teaching of the present invention in an advantageous way. To this end it is to be referred to the following explanation of preferred embodiments of the invention by way of example, illustrated by the figures. In connection with the explanation of the preferred embodiments of the invention by the aid of the figure, generally preferred embodiments and further developments of the teaching will we explained.

DETAILED DESCRIPTION

It should be noted that even though hereinafter practical details and embodiments of the present invention concentrate on 3GPP LTE scenarios, the same principles apply to any other TDD system.

Generally, embodiments of the present invention described hereinafter in connection with FIGS. 3-7 aim to provide a load balancing solution for TDD systems by introducing areas where the neighbor cells or eNBs may overlap giving the opportunity to certain mobile users to utilize resources from more than a single cell during a short time-slot, e.g. 3GPP LTE frame. Such a scheme brings a higher degree of flexibility allowing users to handover to neighboring cells in order to improve the UL/DL load ratio or to use UL and DL resources from different cells at the same time. In addition, specific embodiments of the present invention employ the concept of a "super-cell", where mobile users may utilize specific slots in either UL or DL direction from different cells within the same UL-DL-periodicity-frame.

The mobile user ability to utilize resources from more than a single base station is also supported by the 3GPP Coordinated Multi-Point (CoMP), as described in document 3GPP TR 36.819, Technical Specification Group Radio Access Network; Coordinated multi-point operation for LTE physical layer aspects, (Rel. 11), September 2011. In particular, the objective of CoMP is to improve the radio performance of both FDD and TDD and enhance the cell edge throughput by improving data rates via joint processing or coordinated scheduling and beamforming methods. Similarities to CoMP are restricted to the necessity to identify those base stations that are involved in the cooperation procedure.

By contrast to the present invention, CoMP requires coherent transmission and detection at physically separated base stations. These base stations jointly process the transmit/receive signal in order to gain from array and diversity gains. In the case of coordinated scheduling and beamforming, conventional CoMP still relies on the fundamental requirement to align UL and DL resources of multiple cells. However, CoMP can still be applied to embodiments of the present invention. Finally, conventional CoMP does not provide any means to counteract pseudo-congestion as the applied UL-DL-subframe-pattern is assumed to be fixed for all cells. Specifically, the present invention focuses on load balancing and the resolution of "pseudo-congestion" rather than the improvement of radio conditions. Thus, its objective concentrates on customizing the TDD subframe according to the user resource demand, which is beyond the use of conventional CoMP and cooperative communication.

The benefits of this flexibility in resource management may advantageously be exploited if the process is performed in an autonomous manner. Therefore, an operation and management (OAM) process is envisioned with the responsibility to utilize eNB resources efficiently through load balancing in an asymmetric UL/DL configuration. In LTE systems, such an autonomous process may follow the framework of Self-Organized Network (SON) functions, described for instance in document 3GPP TS 36.300, Technical Specification Group Radio Access Network; Evolved Universal Terrestrial Radio Access (E-UTRA) and Evolved Universal Terrestrial Radio Access Network (E-UTRAN); Overall description; Stage 2 (Rel 10), April 2011, that aim to provide network management operations.

Figure 3:
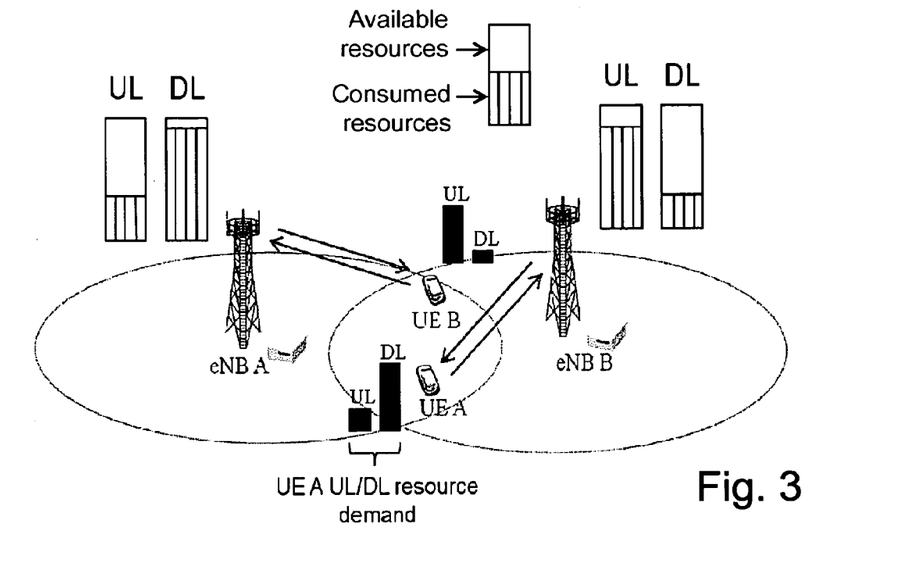
FIG. 3 is a schematic view of a cellular communication network that illustrates a resource management approach according to a first embodiment of the present invention.

FIG. 3 schematically illustrates a part of cellular communication network including two cells, each being served by an eNB, denoted eNB A and eNB B, respectively. The coverage area of the respective cells is indicated by the elliptic curves. Two UEs, denoted UE A and UE B, respectively, are residing within the overlapping area of the two cells. In the simplest form, the present invention may assist the UEs within the overlapping region having particular traffic demands to be assigned to the appropriate eNB, which is depicted in FIG. 3. UE B with a high UL and a low DL demand is associated with eNB A, which provides high UL and adequate DL resources, while UE A is served by eNB B accordingly.

Figure 4:
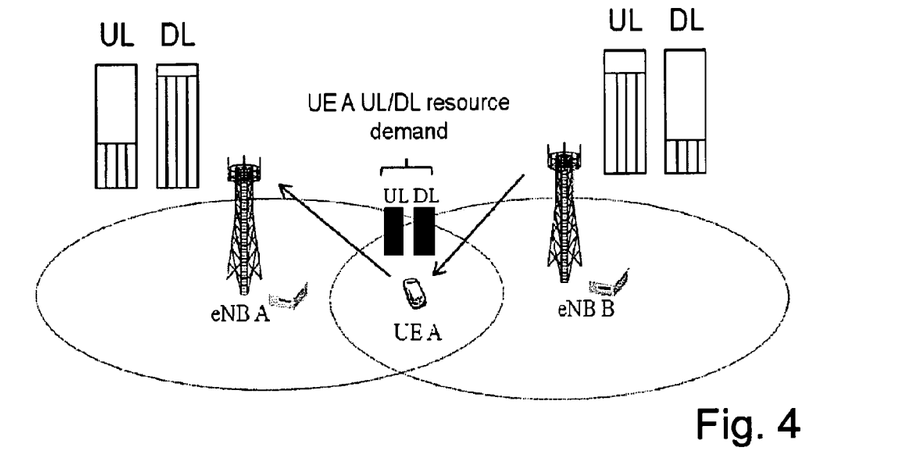
FIG. 4 is a schematic view of a cellular communication network that illustrates a resource management approach according to a second embodiment of the present invention.

However, the main benefits of the present invention are revealed in cases where UEs use UL and DL resources from different eNBs because individual eNBs are not capable to satisfy both UL and DL user requirements at the same time. FIG. 4 illustrates an example where a UE—UE A—utilizes the (high) DL resources of eNB B and the (high) UL resource of eNB A to match better its traffic demand and the network resource availability.

The fundamental principle behind this method is to avoid "pseudo congestion", as introduced in FIG. 1, by matching the traffic demand with the network resource availability. The example depicted in FIG. 4 provides the means of creating more flexible frame configurations for UEs that utilize specific slots from both eNB A and eNB B. Such a property creates a high flexibility of frame construction especially in cases where neighboring eNBs use different UL/DL configuration.

Figure 5:
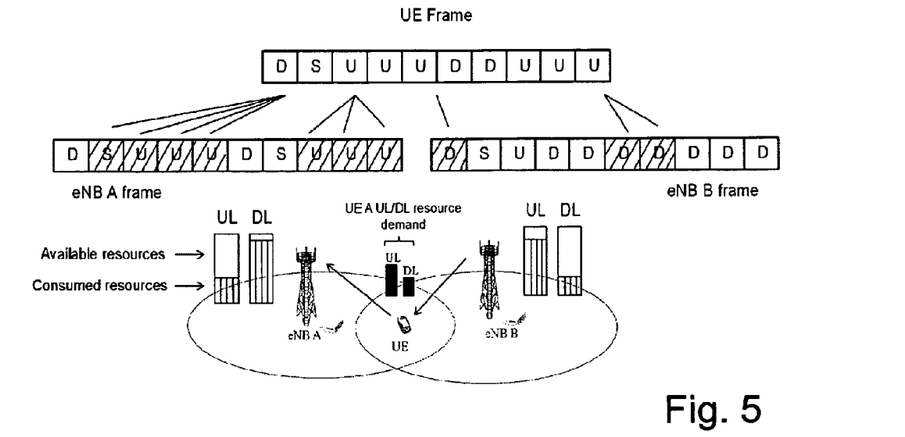
FIG. 5 is a schematic view illustrating the concept of "super-cells" in accordance with an embodiment of the present invention.

FIG. 5 illustrates an example where eNB B uses a different UL/DL-pattern than eNB A such that there are overlapping regions with one eNB being in UL while the second one is in DL. According to an embodiment of the present invention a UE residing in the overlap area is assigned, for instance, to both eNBs and utilizes resources of both eNBs. Hence, instead of remaining in UL at eNB A it switches to DL at eNB B and therefore more flexibility in UL/DL-patterns is provided. As shown in FIG. 5, the UE utilizes the shaded UL slots from eNB A and the shaded DL slots from the eNB B, thereby creating its individualized UE frame, which best matches the UE's current traffic demand.

It should be noted that in this process the UE needs to be informed about the usage of UL/DL configuration from the different eNBs in order to be able to synchronize its transmit/receive mode accordingly. Thus, additional signaling and controlling overhead is required as UEs may be assigned to multiple eNBs. This may be implemented by "super-cells" where adjacent cooperating eNBs appear as one logical eNB (a "super-cell") but still provide different physical configurations.

Figure 6:
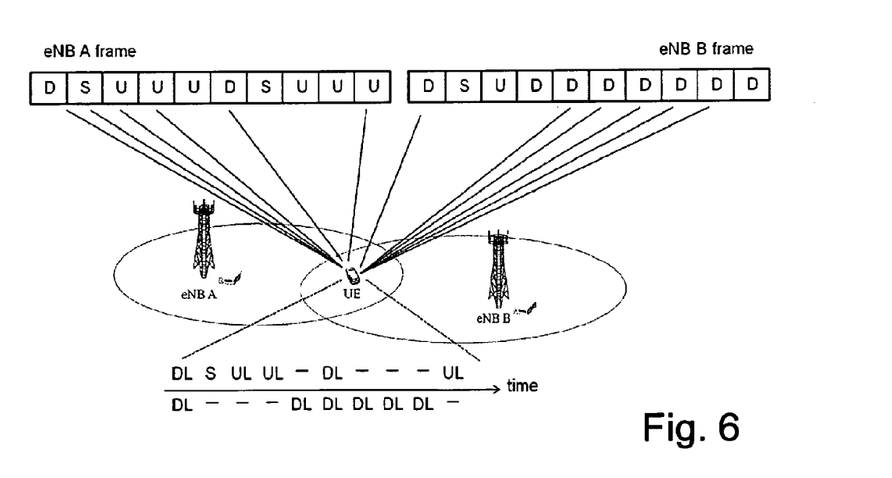
FIG. 6 is a schematic view illustrating the concurrent utilization of slots from more than one base station in accordance with an embodiment of the present invention.

Within a "super-cell", a UE may utilize frame slots from different eNBs at the same time. In this way, the use of network resources may be even more flexible and efficient, providing the opportunity to support more diverse applications. In FIG. 6, the UE utilizes the first and sixth DL slots of eNB A and eNB B at the same time, the third, fourth and tenth UL slots of eNB A and the fifth, seventh, eighth and ninth DL slot of eNB B.

Figure 7:
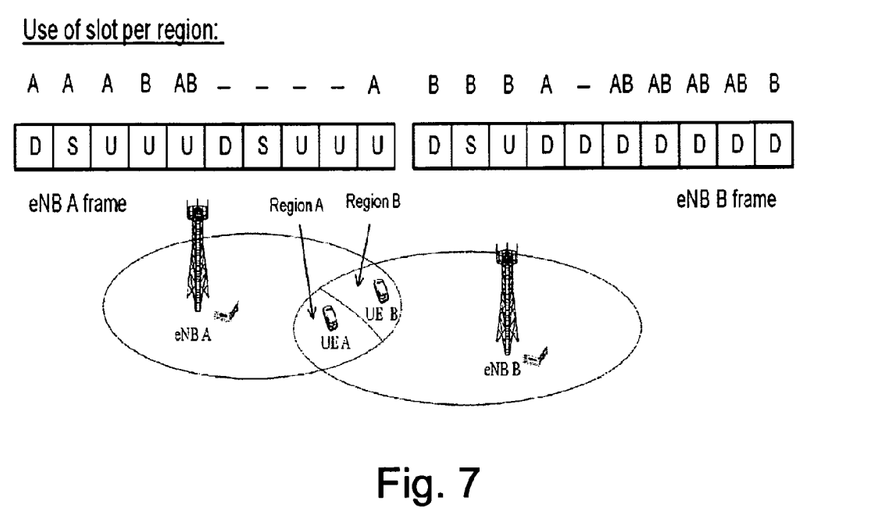
FIG. 7 is a schematic view illustrating the concept of "super-cells" with multiple regions having different UL/DL characteristics in accordance with an embodiment of the present invention.

In some scenarios, the overlapping areas could also be divided into different regions that support different traffic demands offering a different set of UL/DL slots to residing UEs. In this context, the UL/DL of a mobile host may be used to associate the UL and DL resource demand within a particular area for the purpose of load balancing and efficient resource usage. FIG. 7 illustrates an example where the overlapping area among two neighboring eNBs is divided into two regions named region A and region B. Each of these regions utilizes a different set of UL and DL slots from eNB A and eNB B, respectively. In this way, the frame available within each cell and among the different regions is different. In particular, region A utilizes the first, second, third, fifth and last slot of the eNB A frame and the fourth, sixth, seventh, eighth and ninth slot of the eNB B frame, while region B utilizes the fourth and fifth slots of eNB A and the remaining slots are utilized from eNB B. In this way, even more resource flexibility could be achieved. This super-cell deployment is expected to become more diverse as the cell sizes become smaller and the number of neighboring cells increases.

The super-cell creation/maintenance and management process can be handled by the steps provided below assuming that a "super-cell" is already in operation:
1. eNBs constantly monitor the resource availability and the residing UE's UL/DL distribution location inside their cell.
2. Once the UL/DL imbalance or UL/DL absolute value surpass a predetermine threshold, a search for a solution employing management-handover optimization/decision methods is initiated.
3. If the problem is not resolved, the load information from neighbor eNBs in combination with local monitoring data is used to select the new formation of the super-cell.
4. The power of specific slots is adapted and the decision is communicated among neighboring eNBs and affected UEs.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers futher embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for resource management in a cellular communication network, wherein the network includes at least one base station per cell for a plurality of cells that operate in a Time Division Duplex (TDD) transmission mode, each base station having a respective coverage area, wherein a user equipment (UE) is located in a spatial zone in which the respective coverage areas of at least two base stations overlap, wherein the method comprises:
utilizing, by the UE, uplink (UL) and/or downlink (DL) resources from the at least two base stations with overlapping coverage areas based on UL and/or DL traffic demands, wherein the utilizing the UL and/or DL resources from the at least two base stations with overlapping coverage areas further comprises:
within a single UE frame, using UL slots from both of the at least two base stations with overlapping coverage areas and/or using DL slots from both of the at least two base stations with overlapping coverage areas.

2. The method according to claim 1, wherein the at least two base stations with overlapping coverage areas employ different UL/DL-patterns.

3. The method according to claim 1, wherein individual TDD frames of the at least two base stations with overlapping coverage areas are customized for the UE and one or more other UEs by utilizing single slots of the individual TDD frames for different UEs.

4. The method according to claim 1, wherein the at least two base stations with overlapping coverage areas are configured to inform the UE about the UL/DL-configuration being employed by each respective base station.

5. The method according to claim 1, wherein the at least two base stations with overlapping coverage areas are configured to cooperate with each other to operate super cell from the perspective of the UE.

6. The method according to claim 5, wherein the at least two base stations with overlapping coverage areas are configured to provide UL and/or DL frame slots from different base stations of the at least two base stations with overlapping coverage areas within a single UE frame.

7. The method according to claim 5, wherein said multiple super cells having different UL/DL characteristics are provided within an overlap area.

8. The method according to claim 5, wherein creation of a super cell is carried out on demand, based on network resource availability and/or UE resource requirements.

9. The method according to claim 1, wherein the at least two base stations with overlapping coverage areas are configured to monitor UL and DL traffic load for particular locations within their coverage area.

10. The method according to claim 1, wherein the at least two base stations with overlapping coverage areas are configured to regularly exchange load information related to UL and/or DL resources using an X2 interface.

11. The method according claim 1, wherein transmission and/or reception of data via multiple base stations is coordinated by transmitting data destined for a particular UE as duplicated data to all base stations the particular UE is connected to.

12. The method according to claim 1, wherein transmission and/or reception of data via multiple base stations is coordinated by transferring data destined for a particular UE towards all base stations the particular UE is connected to using an X2 interface.

13. The method according to claim 1, wherein data sessions are split in a Serving-Gateway (S-GW) or in a Packet Data Network (PDN) Gateway (P-GW).

14. The method according to claim 1, wherein a handover mechanism is provided that assigns UEs residing in an overlap area to an appropriate base station or region.

15. One or more non-transitory computer-readable media having processor-executable instructions stored thereon for resource management in a cellular communication network, wherein the network includes at least one base station per cell for a plurality of cells that operate in a Time Division Duplex (TDD) transmission mode, each base station having a respective coverage area, wherein a user equipment (UE) is located in a spatial zone in which the respective coverage areas of at least two base stations overlap, wherein the processor-executable instructions, when executed, facilitate the following:

the UE utilizing uplink (UL) and/or downlink (DL) resources from the at least two base stations with overlapping coverage areas based on UL and/or DL traffic demands, wherein the utilizing the UL and/or DL resources from the at least two base stations with overlapping coverage areas further comprises:

within a single UE frame, using UL slots from both of the at least two base stations with overlapping coverage areas and/or using DL slots from both of the at least two base stations with overlapping coverage areas.

* * * * *